June 10, 1930. V. BENDIX 1,762,710
BRAKE BACKING PLATE
Filed March 23, 1927

INVENTOR
VINCENT BENDIX
BY
Jn. W. McConkey
ATTORNEY

Patented June 10, 1930

1,762,710

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE-BACKING PLATE

Application filed March 23, 1927. Serial No. 177,546.

This invention relates to brakes, and is illustrated as embodied in brake mechanism for a front automobile wheel. An object of the invention is to provide an improved backing plate serving to support the brake itself, and also serving to close the open side of the brake drum.

One feature of the invention has to do with arranging the plate to permit the use of certain types of brake-operating means, for example the well-known "crank-and-lever" type, on a brake for a front wheel having its king-pin set well inside the brake drum, by providing a transverse depression in the plate for the joint between the crank and the lever, or their equivalents, which joint should be immediately in line with the king-pin.

Another feature relates to mounting the brake-applying device, or some other sub-assembly of the brake, on the backing plate as a unit, by providing it with fastenings passing through the narrow ends of keyhole-shaped slots or openings in the backing plate, and with nuts or other securing means small enough to pass through the larger ends of the slots and adapted to be clamped against the plate after the fastenings have been shifted to the narrow ends of the slots.

The above and other objects and features of the invention, including various novel combinations of parts and desirable particular constructions, will be apparent from the following description of one illustrative embodiment shown in the accompanying drawing, in which.

Figure 1:
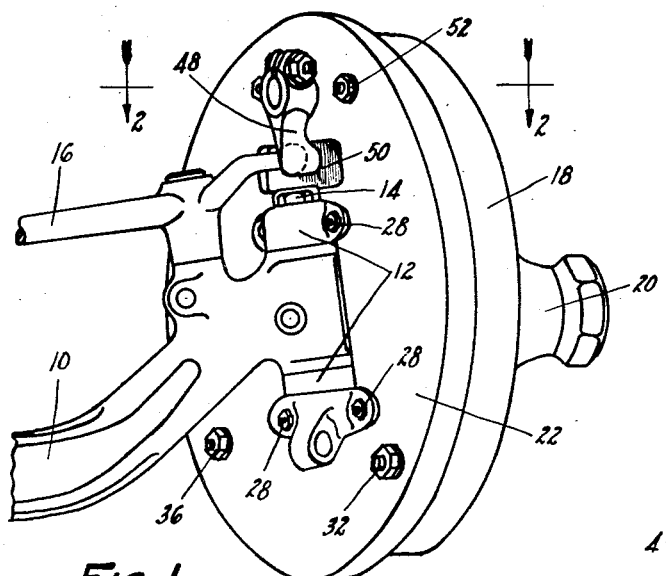
Figure 1 is a perspective view of the brake mechanism of one front wheel of an automobile, looking toward the rear of the car.
Figure 4:
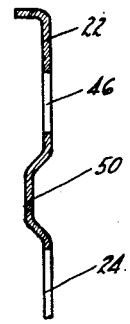
Figure 4 is a partial vertical section through the upper part of the plate, on the line 4—4 of Figure 3.
Figure 3:
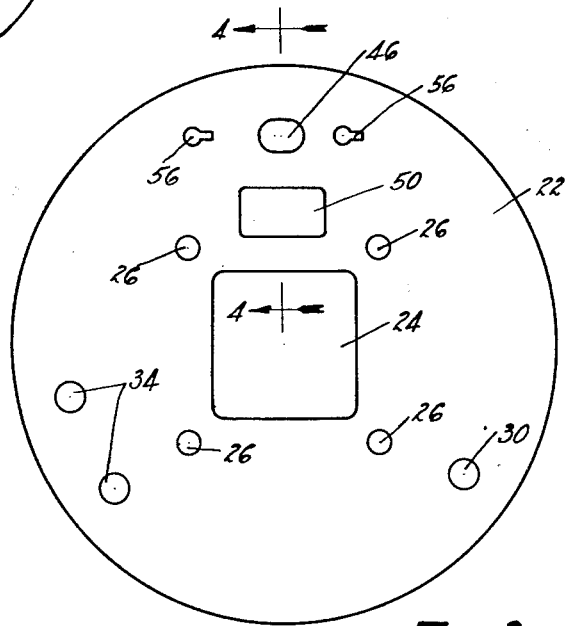
Figure 3 is an elevation of the novel backing plate.

The mechanism shown in Figure 1 includes a front axle 10, to which a knuckle 12 is swivelled by a king-pin 14 or the like, and on which is pivoted a lever 16 forming part of a "crank-and-lever" control for a brake. The brake includes a drum 18 rotating with the wheel, the hub of which is shown at 20.

Figure 2:
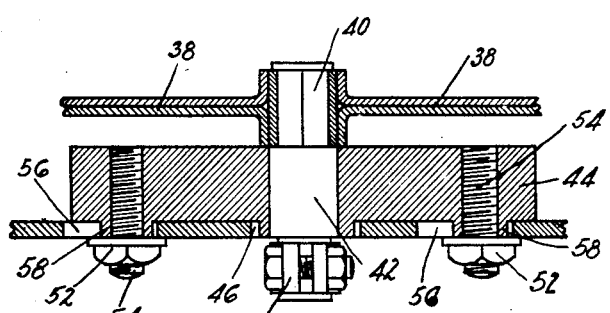
Figure 2 is a partial section through the applying means of the brake, on the line 2—2 of Figure 1.

At the open side of drum 18 is a novel backing plate 22, formed with a central opening 24 for knuckle 12, and with openings 26 for bolts 28 securing the backing plate to the knuckle. The plate may have at its edge a flange encircling the edge of the drum. The plate also has an opening 30 for an adjusting device 32 of the brake, and openings 34 for the anchors 36 of the brake shoes, parts of two of which appear at 38 in Figure 2. The illustrated brake is fully described in Patent No. 1,567,716, granted Bendix Brake Company on December 29, 1925, on an application of A. Y. Dodge.

The brake is applied by any suitable means, such as a double cam 40 integral with a shaft 42 journalled in a bracket or support 44 which, in the assembled brake, engages the inner face of the backing plate. Shaft 42 passes through an opening 46 in the backing plate, and is provided with a crank or arm 48 engaged by the operating lever 16.

It is important that the joint between lever 16 and crank 48, or their equivalents, should come above and directly in line with the king-pin 14 when the brake is applied. One feature of the invention relates to making this possible when the front wheel mounting is such that the king-pin 16 comes well inside the drum, by providing a transverse depression or groove 50 in the backing plate, into which the end of lever 16 and the curved lever end of crank 48 may project.

One important feature relates to permitting a complete sub-assembly of the brake, such as the sub-assembly including cam 40 and shaft 42 and crank 48 and support 44, to be mounted on the backing plate 22 without removing or attaching any nuts or other extra parts.

To this end, the nuts 52, or equivalent securing means, are mounted on fastenings or studs 54 of such size as to fit the narrow ends of key-hole shaped openings or slots 56, or are provided with collars 58 which fit such openings and which are illustrated as integral with bracket 44. Nuts 52 are small enough to be passed through the large ends of the openings 56, and crank 48 can be passed through opening 46, whereupon the sub-assembly is shifted to the right and nuts 52 are tightened up against the collars 58. Preferably this does not clamp bracket 44 so tight but that it can shift to permit cam 40 to center itself.

While one illustrative embodiment has been described in detail, it is not my intention to limit the scope of the invention to that particular embodiment, or otherwise than by the terms of the appended claims.

I claim:

1. A backing plate for a brake having openings which are relatively large at one side and narrow at the other, to form in effect keyhole-shaped slots, in combination with brake means having a part including fastenings fitting the narrow ends of the openings and securing means on the fastenings which can be passed through the large ends of the openings but not through the narrow ends.

2. A backing plate for a brake having openings which are relatively large at one side and narrow at the other, to form in effect keyhole-shaped slots, in combination with brake means having a part including fastenings fittings the narrow ends of the openings and nuts threaded on the ends of the fastenings and which can be passed through the large ends of the openings but not through the narrow ends.

3. A backing plate for a brake having openings which are relatively large at one side and narrow at the other, to form in effect keyhole-shaped slots, in combination with brake means having a brake-applying device extending through the backing plate adjacent said openings and with a portion engageable with the inner face of the backing plate and including fastenings fitting the narrow ends of the openings and nuts threaded on the ends of the fastenings and which can be passed through the large ends of the openings but not through the narrow ends.

4. A backing plate for a brake having openings which are relatively large at one side and narrow at the other, to form in effect keyhole-shaped slots.

In testimony whereof, I have hereunto signed my name.

VINCENT BENDIX.